United States Patent [19]
Loper et al.

[11] Patent Number: 5,850,563
[45] Date of Patent: Dec. 15, 1998

[54] PROCESSOR AND METHOD FOR OUT-OF-ORDER COMPLETION OF FLOATING-POINT OPERATIONS DURING LOAD/STORE MULTIPLE OPERATIONS

[75] Inventors: Albert J. Loper, Cedar Park; Soummya Mallick, Austin, both of Tex.

[73] Assignee: International Business Machines Corporation, Armonk, N.Y.

[21] Appl. No.: 526,610

[22] Filed: Sep. 11, 1995

[51] Int. Cl.⁶ .................................................. G06F 9/38
[52] U.S. Cl. ............................ 395/800.23; 395/800.01; 395/376; 395/389; 395/385; 364/DIG. 1
[58] Field of Search .................... 395/800, 376, 395/389, 385, 800.01, 800.23; 364/DIG. 1

[56] References Cited

U.S. PATENT DOCUMENTS

| | | | |
|---|---|---|---|
| 4,493,020 | 1/1985 | Kim et al. ................................. | 395/393 |
| 4,903,196 | 2/1990 | Pomerene et al. ....................... | 395/393 |
| 5,051,885 | 9/1991 | Yates, Jr. et al. ........................ | 364/200 |
| 5,117,490 | 5/1992 | Duxbury et al. ......................... | 395/394 |
| 5,241,636 | 8/1993 | Kohn ........................................ | 395/391 |
| 5,355,457 | 10/1994 | Shebanow et al. ..................... | 395/394 |
| 5,363,495 | 11/1994 | Fry et al. ................................. | 395/375 |
| 5,396,610 | 3/1995 | Yoshida et al. ......................... | 711/150 |
| 5,467,473 | 11/1995 | Kahle et al. ............................. | 395/800 |
| 5,511,175 | 4/1996 | Favor et al. ............................. | 395/375 |
| 5,542,109 | 7/1996 | Blomgren et al. ...................... | 395/800 |
| 5,594,864 | 1/1997 | Trauben ............................... | 395/183.15 |
| 5,625,789 | 4/1997 | Hesson et al. .......................... | 395/393 |

*Primary Examiner*—Alyssa H. Bowler
*Assistant Examiner*—Doug Nguyen
*Attorney, Agent, or Firm*—Casimer K. Salys; Brian F. Russell; Andrew J. Dillon

[57] ABSTRACT

A method and apparatus in a superscalar microprocessor for early completion of floating-point instructions prior to a previous load/store multiple instruction is provided. The microprocessor's load/store execution unit loads or stores data to or from the general purpose registers, and the microprocessor's dispatch unit dispatches instructions to a plurality of execution units, including the load/store execution unit and the floating point execution unit. The method comprises the dispatch unit dispatching a multi-register instruction to the load/store unit to begin execution of the multi-register instruction, wherein the multi-register instruction, such as a store multiple or a load multiple, stores or loads data from more than one of the plurality of general purpose registers to memory, and further, prior to the multi-register instruction finishing execution in the load/store unit, the dispatch unit dispatches a floating-point instruction, which is dependent upon source operand data stored in one or more floating-point registers of the plurality of floating point registers, to the floating-point execution unit, wherein the dispatched floating-point instruction completes execution prior to the multi-register instruction finishing execution.

4 Claims, 2 Drawing Sheets

|  | 1 | 2 | 3 | 4 | 5 | 6 | 7 | 8 | 9 | 10 |
|---|---|---|---|---|---|---|---|---|---|---|
| Store Mult | F | Dec | Disp | E | E | E | E | C |  |  |
| FP Inst |  |  |  |  |  |  |  |  | F | Dec |
| FP Inst |  |  |  |  |  |  |  |  |  | F |
|  |  |  |  |  |  |  |  |  |  |  |
|  |  |  |  |  |  |  |  |  |  |  |

*Fig. 2*

|  | 1 | 2 | 3 | 4 | 5 | 6 | 7 | 8 | 9 | 10 |
|---|---|---|---|---|---|---|---|---|---|---|
| Store Mult | F | Dec | Disp | E | E | E | E | C |  |  |
| FP Inst |  | F | Dec | Disp | E | C |  |  |  |  |
| FP Inst |  |  | F | Dec | Disp | E | C |  |  |  |
|  |  |  |  |  |  |  |  |  |  |  |
|  |  |  |  |  |  |  |  |  |  |  |

*Fig. 3*

PROCESSOR AND METHOD FOR OUT-OF-ORDER COMPLETION OF FLOATING-POINT OPERATIONS DURING LOAD/STORE MULTIPLE OPERATIONS

BACKGROUND OF THE INVENTION

1. Technical Field

The present invention relates in general to a method and system of executing instructions in a microprocessor, and in particular the present invention relates to a method and device of executing and completing floating point instructions during the execution of a load/store multiple operation.

2. Description of the Related Art

In modern microprocessors, multi-register load/store instructions, or load/store multiple instructions, move blocks of data between the microprocessor's general purpose registers (GPRs) and memory, such as cache or RAM. In the prior art, multi-register load/store instructions require complete serialization with subsequent instructions, since multi-register instructions modify or use up to all general purpose registers (usually 32) contained within the microprocessor. Because reading or writing to multiple registers requires multiple cycles to execute, later instructions in the instruction sequence, including floating-point operations, are held in the instruction buffer until the multi-register instruction is complete in order to prevent corruption of register data by out-of-order execution. Such a system substantially restricts microprocessor performance by holding up the instruction pipeline until the multi-register instruction is completed.

What is needed is a method and system for allowing subsequent floating point instructions to begin and perhaps even complete execution while the multi-register instruction is executing. Such a mechanism would substantially improve the performance of a microprocessor having a superscalar design by allowing instructions that utilize multiple registers to be executed in parallel with subsequent floating-point instructions.

SUMMARY OF THE INVENTION

According to the present invention, a method and apparatus in a superscalar microprocessor for early completion of floating-point instructions prior to a previous load/store multiple instruction is provided. The microprocessor's load/store execution unit loads or stores data to or from the general purpose registers, and the microprocessor's dispatch unit dispatches instructions to a plurality of execution units, including the load/store execution unit and the floating point execution unit. The method comprises the dispatch unit dispatching a multi-register instruction to the load/store unit to begin execution of the multi-register instruction, wherein the multi-register instruction, such as a store multiple or a load multiple, stores or loads data from more than one of the plurality of general purpose registers to memory, and further, prior to the multi-register instruction finishing execution in the load/store unit, the dispatch unit dispatches a floating-point instruction, which is dependent upon source operand data stored in one or more floating-point registers of the plurality of floating point registers, to the floating-point execution unit, wherein the dispatched floating-point instruction completes execution prior to the multi-register instruction finishing execution.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 shows a timing diagram of the cycles required to handle the load/store multiple instruction and subsequent floating-point instructions in the prior art; and FIG. 3 shows a timing diagram of the cycles required to handle a load/store multiple instruction and two subsequent floating-point instructions in the microprocessor of the present invention, in accordance with the preferred embodiment of the present invention.

DETAILED DESCRIPTION OF THE PREFERRED EMBODIMENT

Figure 1:
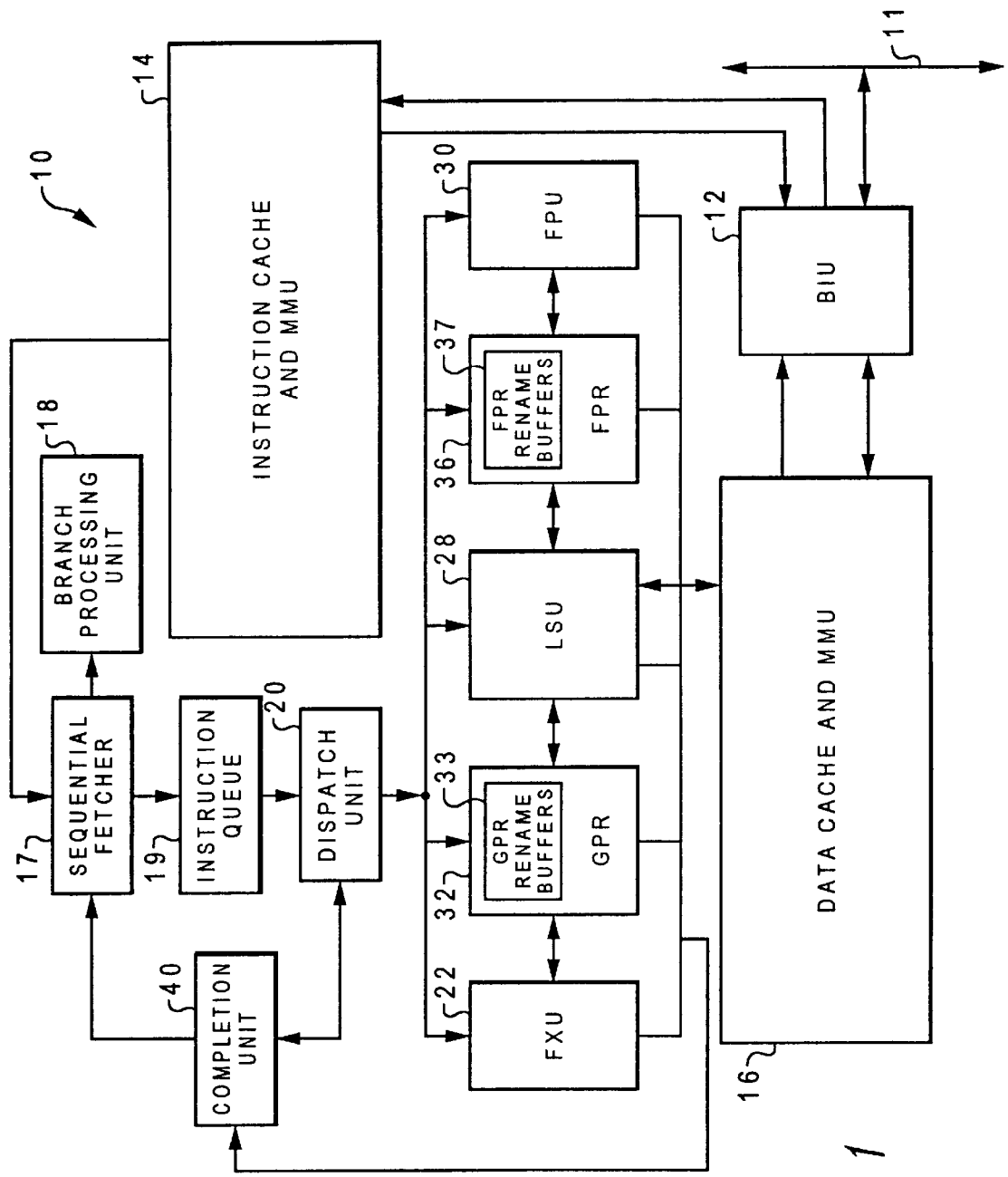
FIG. 1 illustrates a block diagram of a processor for processing information according to a preferred embodiment of the present invention.

With reference now to the figures and in particular with reference to FIG. 1, there is illustrated a block diagram of a processor, indicated generally at 10, for processing information according to a preferred embodiment of the present invention. In the depicted embodiment, processor 10 comprises a single integrated circuit superscalar microprocessor. Accordingly, as discussed further below, processor 10 includes various execution units, registers, buffers, memories, and other functional units, which are all formed by integrated circuitry. In a preferred embodiment of the present invention, processor 10 comprises one of the PowerPC™ line of microprocessors produced by International Business Machines, Inc., which operates according to reduced instruction set computing (RISC) techniques.

As depicted in FIG. 1, processor 10 is coupled to system bus 11 via a bus interface unit (BIU) 12 within processor 10. BIU 12 controls the transfer of information between processor 10 and other devices coupled to system bus 11, such as a main memory (not illustrated). Processor 10, system bus 11, and the other devices coupled to system bus 11 together form a host data processing system. BIU 12 is connected to instruction cache 14 and data cache 16 within processor 10. High speed caches, such as instruction cache 14 and data cache 16, enable processor 10 to achieve relatively fast access time to a subset of data or instructions previously transferred from main memory to the high speed caches, thus improving the speed of operation of the host data processing system. Instruction cache 14 is further coupled to sequential fetcher 17, which fetches instructions from instruction cache 14 during each cycle for execution. Sequential fetcher 17 transfers branch instructions to branch processing unit (BPU) 18 for execution, and transfers sequential instructions to instruction queue 19 for temporary storage before being executed by other execution circuitry within processor 10.

In the depicted embodiment, in addition to BPU 18, the execution circuitry of processor 10 comprises multiple execution units, including fixed-point unit (FXU) 22, load/store unit (LSU) 28, and floating-point unit (FPU) 30. As is well-known to those skilled in the computer art, each of execution units 22, 28, and 30 executes one or more instructions within a particular class of sequential instructions during each processor cycle. For example, FXU 22 performs fixed-point mathematical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 performs floating-point operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily load/store the result data until the instructions are completed by transferring the result data from FPR rename buffers 37 to selected FPRs 36. LSU 28 executes floating-point and fixed-point instructions that either load data from memory (i.e., either data cache 16 or main memory) into selected GPRs 32 or FPRs 36, or that load/store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. As is typical of high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. Sequential instructions fetched from instruction cache 14 are stored by sequential fetcher 17 within instruction queue 19. Fetched branch instructions are removed from the instruction stream and are forwarded to BPU 18 for execution. BPU 18 includes a branch prediction mechanism, such as a branch history table, that enables BPU 18 to speculatively execute unresolved conditional branch instructions by predicting whether the branch will be taken.

During the decode/dispatch stage, dispatch unit 20 decodes and dispatches one or more instructions from instruction queue 19 to the appropriate ones of execution units 22, 28, and 30. Also during the decode/dispatch stage, dispatch unit 20 allocates a rename buffer within GPR rename buffers 33 or FPR rename buffers 37 for each dispatched instruction's result data. According to a preferred embodiment of the present invention, processor 10 dispatches instructions in program order and tracks the program order of the dispatched instructions during out-of-order execution utilizing unique instruction identifiers. In addition to an instruction identifier, each instruction within the execution pipeline of processor 10 has an rA tag and a rB tag, which indicate the sources of the A and B operands for the instruction, and a rD tag that indicates a destination rename buffer within GPR rename buffers 33 or FPR rename buffers 37 for the result data of the instruction.

During the execute stage, execution units 22, 28, and 30, execute instructions received from dispatch unit 20 opportunistically as operands and execution resources for the indicated operations are available. After execution has finished, execution units 22, 28, and 30 load/store result data within either GPR rename buffers 33 or FPR rename buffers 37, depending upon the instruction type. Then, execution units 22, 28, and 30 notify completion unit 40 which instructions have finished execution. Finally, instructions are completed by completion unit 40 in program order by transferring result data from GPR rename buffers 33 and FPR rename buffers 37 to GPRs 32 and FPRs 36, respectively.

In a preferred embodiment of the present invention, processor 10 is capable of executing multi-register instructions, which load and or store data in a plurality of general purpose registers from and to memory. In particular, in the preferred embodiment of the PowerPC™ microprocessor, microprocessor 10 will execute a load multiple instruction (lmw), which loads multiple words from memory into the general purpose registers (GPRs), and a store multiple instruction (stmw), which stores multiple words from the GPRs to memory.

These multi-register instructions are retrieved from instruction cache 14 by sequential fetcher 17 and loaded into instruction queue 19. Upon dispatch of a multi-register instruction by dispatch unit 20, LSU 28 will begin execution of the multi-register instruction. Also, upon dispatch of the instruction, a number of registers in GPR 32 identified in the multi-register instruction are allocated to the instruction.

In the preferred embodiment, the load/store multiple instruction requires that up to 32 contiguous registers be stored with up to 32 contiguous words from memory. For example, the store multiple instruction stmw r3, r2, r1 will load/store the contents of register 3–register 31 to the memory located at <r2+r1>. Thus, for this example, the first register to be stored will be register 3 (r3). LSU 28 will then proceed to load/store register 4, register 5, and so on until all the registers up to and including register 31 have been stored. At that point the store multiple instruction has finished execution. This is reported to completion unit 40, which completes the instruction by committing it to architected registers in the system.

Referring to FIG. 2, there is shown a timing diagram of the processor cycles required to handle a store multiple instruction and subsequent floating-point instructions in a microprocessor of the prior art. The store multiple instruction (store Mult) is fetched (F) from instruction cache 14 by sequential fetcher 17 during cycle 1. The instruction is decoded (Dec) during cycle 2 and dispatched (Disp) by dispatch unit 20 to LSU 28 during cycle 3. LSU 28 executes (E) the store multiple instruction during cycled 4–7, and the instruction is completed (C) by completion unit 40 during cycle 8.

In the prior art, any floating-point instructions subsequent to a load/store multiple instruction would be serialized so that they would not be fetched until after the load/store multiple instruction completed. This guarantees the integrity of the operand data being stored. Therefore, in the example of FIG. 2, subsequent floating-point instructions are not fetched until cycle 9 in the prior art. Such a system substantially restricts microprocessor performance by holding up the instruction pipeline until the multi-register instruction is completed.

According to the present invention, out-of-order completion of subsequent floating-point instructions is allowed during the execution of a load/store multiple instruction. For example, in the preferred embodiment, the store multiple operation requires that up to 32 contiguous registers be stored with up to 32 contiguous word locations in memory. For example, the store multiple instruction stmw r3, r2, r1 will store the contents of register 3–register 31 to the memory located at <r2+r1>. According to the present invention, upon dispatch of the store multiple instruction, subsequent floating-point instructions can be dispatched to the floating-point execution units in the microprocessor, unconditionally. Moreover, these floating-point instructions complete prior to the store multiple, out of programming sequence.

In the present invention, it is recognized that a multi-register instruction does not have to be serialized with subsequent floating-point instructions because the result data from the floating-point operation will be stored in the floating-point registers, whereas the load/store multiple is storing from the general purpose registers. Consequently, the entire contiguous set of registers required for the load/store multiple instruction cannot be corrupted by the executing floating-point instruction. This type of early completion does not violate the requirement that the programmer must have the perspective that all events occur in program order, even though an instruction resulting in an exception is not completed in order. If the execution of the floating-point operation results in an exception while the multi-register instruction is still executing, the exception is not taken until the multi-register instruction has completed.

Referring now to FIG. 3, there is shown a timing diagram of the cycles in which a store multiple instruction (Store Mult) and two floating-point instructions (FP Inst3 and FP Inst4) are handled in the microprocessor of the present invention, in accordance with the preferred embodiment of the present invention. As an example, consider the handling of the following instruction sequence:

| | | |
|---|---|---|
| stmw | r28, r2, r1 | |
| fp-add | r2, r2, r28 | |
| fp-add | r3, r3, r30 | |

As can be seen in FIG. 3, the store multiple instruction is fetched during cycle 1, decoded in cycle 2, dispatched in cycle 3, executed by the load/store unit 28 during cycles 4–7, and is completed in cycle 8. In accordance with the present invention, out-of-order completion is supported by allowing FP Inst1 and FP Inst2 to be dispatched any time before or after dispatch of the store multiple instruction. In this example, the floating-point instructions are dispatched in program sequence as soon as possible after the prior store multiple instruction has been dispatched in cycle 3. FP Inst1 is dispatched during cycle 4, and because only one instruction may be fetched per cycle, FP Inst2 is dispatched during cycle 5. These floating-point instructions may execute immediately in the floating-point execution unit 30, as is done in cycles 5 and 6, regardless of the progress of the store multiple instruction execution. The results of the floating-point instructions 1 and 2 are held in rename buffers 37 until cycles 6 and 7, respectively, at which time the result operands are stored to registers 2 and 3, respectively. Therefore, as has been explained, the floating-point instructions are allowed to complete before the store multiple instruction, which is prior in the program sequence, has completed.

In summary, the present invention provides a method and device for early completion of floating-point operations during the execution of a prior load/store multiple instruction. The present invention substantially increases the microprocessor performance by not requiring serialization and by allowing additional subsequent instructions to be executed simultaneously with the load/store multiple instruction. Depending upon the microprocessor's completion buffer, a significant amount of additional instructions may be executed and completed by the microprocessor during the execution of the multi-register instruction. For example, in the preferred embodiment, with a completion buffer depth of five registers, there is a potential of up to four additional instructions completing without a pipeline stall. Because load/store multiple instructions can take up to 36 cycles to complete, the present invention provides a substantial time savings that will enhance microprocessor speed and efficiency.

While the invention has been particularly shown and described with reference to a preferred embodiment, it will be understood by those skilled in the art that various changes in form and detail may be made therein without departing from the spirit and scope of the invention.

What is claimed is:

1. A method of supporting out-of-order completion of multiple instructions in a microprocessor, including at least one multi-register instruction that either stores or loads data from more than one register of a plurality of general purpose registers to memory, the processor having a dispatcher, a plurality of general purpose registers, a plurality of floating-point registers, and a plurality of execution units including a load/store unit and a floating-point execution unit, the method comprising the steps of:

dispatching a multi-register instruction from the dispatcher to the load/store unit, wherein the load/store unit begins executing the multi-register instruction when dispatched;

dispatching a floating-point instruction that is subsequent to the dispatched multi-register instruction in program order, and which is dependent upon source operand data stored in one or more floating point registers of the plurality of floating point registers, from the dispatcher to the floating-point execution unit, which executes the floating-point instruction; and completing execution of the floating point instruction after the multi-register instruction is dispatched to the load/store unit but prior to the multi-register instruction finishing execution, wherein said completing step comprising the step of storing result data of said floating-point instruction within at least one of said plurality of floating-point registers.

2. The method of supporting out-of-order completion of multiple instructions in a microprocessor according to claim 1, wherein the multi-register instruction stores data from a plurality of general purpose registers to memory.

3. The method of supporting out-of-order completion of multiple instructions in a microprocessor according to claim 1, wherein the multi-register instruction loads data from memory to a plurality of general purpose registers.

4. A microprocessor capable of completing floating-point instructions out-of-order from a previous load/store multiple instruction, and being connected to a memory, comprising:

a plurality of general purpose registers for selectively storing integer data;

a plurality of floating-point registers for selectively storing floating-point data;

a load/store execution unit that executes load multiple and store multiple instructions which load or store data to or from the plurality of general purpose registers;

a floating-point execution unit for performing floating-point operations on operand data stored in the plurality of floating point registers;

a dispatch unit that dispatches instructions to a plurality of execution units, including the load/store execution unit and the floating point execution unit, wherein the dispatch unit dispatches a multi-register instruction to the load/store unit to begin execution of the multi-register instruction, and wherein, prior to the multi-register instruction finishing execution in the load/store unit, the dispatch unit dispatches a floating-point instruction, which is dependent upon source operand data stored in one or more floating point registers of the plurality of floating point registers, to the floating point execution unit; and a completion unit that completes execution of the dispatched floating-point instruction prior to the multi-register instruction finishing execution by causing result data of said floating-point instruction to be stored in at least one of said plurality of floating-point registers.

* * * * *